United States Patent
Ichimura

(10) Patent No.: US 7,369,198 B2
(45) Date of Patent: May 6, 2008

(54) REFLECTION-TYPE LIQUID CRYSTAL DISPLAY PANEL AND METHOD OF FABRICATING THE SAME

(75) Inventor: Koji Ichimura, Tokyo-To (JP)

(73) Assignee: Dai Nippon Printing Co., Ltd., Shinjuku-Ku, Tokyo-To (JP)

( * ) Notice: Subject to any disclaimer, the term of this patent is extended or adjusted under 35 U.S.C. 154(b) by 0 days.

(21) Appl. No.: 10/968,729

(22) Filed: Oct. 18, 2004

(65) Prior Publication Data

US 2005/0052598 A1 Mar. 10, 2005

Related U.S. Application Data

(62) Division of application No. 09/992,062, filed on Nov. 5, 2001, now Pat. No. 6,882,387, which is a division of application No. 09/421,103, filed on Oct. 19, 1999, now Pat. No. 6,327,009, which is a division of application No. 09/048,754, filed on Mar. 25, 1998, now Pat. No. 6,181,397.

(30) Foreign Application Priority Data

| Apr. 1, 1997 | (JP) | ................................ 9-96404 |
| Apr. 1, 1997 | (JP) | ................................ 9-96405 |

(51) Int. Cl.
*G02F 1/1335* (2006.01)
(52) U.S. Cl. ..................................... 349/113
(58) Field of Classification Search ........ 349/113–114, 349/138, 42, 65, 64
See application file for complete search history.

(56) References Cited

U.S. PATENT DOCUMENTS 4,431,272 A * 2/1984 Yazawa et al. ............. 349/113

(Continued)

FOREIGN PATENT DOCUMENTS

EP 0 586 220 A1 8/1993

(Continued)

OTHER PUBLICATIONS

Japanese Office Action issued Dec. 20, 2005.

*Primary Examiner*—James A. Dudek
(74) *Attorney, Agent, or Firm*—Morgan & Finnegan, L.L.P.

(57) ABSTRACT

In a reflection-type liquid crystal display panel (10) provided with reflective electrodes (13a), a reflective metal film (13a) is formed on an insulating layer (12) having a surface provided with minute irregularities (17) to form the reflective metal electrodes having surfaces of a shape substantially complementary to the minute irregularities. Since the surfaces of the electrodes (13a) are provided with minute irregularities, external light incident on the liquid crystal display panel is not reflected in a specular reflection mode, so that images are displayed on the liquid crystal display panel in satisfactory visibility. The insulating layer is formed by forming a positive photosensitive resin layer on a back substrate (10a), exposing the positive photosensitive resin layer to light through a transparent sheet (18) having a surface provided with minute irregularities, and subjecting the exposed positive photosensitive resin layer to a developing process. The thus fabricated liquid crystal display panel is capable of suppressing reflection of external matters therein and of displaying images in satisfactory visibility. The insulating layer (12) underlying the electrodes (13a) is patterned in a pattern similar to that of the electrodes (13a) to suppress current leakage between the electrodes. A method of fabricating the reflection-type liquid crystal display panel is also disclosed.

7 Claims, 10 Drawing Sheets

U.S. PATENT DOCUMENTS

| | | | |
|---|---|---|---|
| 4,456,336 A * | 6/1984 | Chung et al. | 349/160 |
| 4,519,678 A * | 5/1985 | Komatsubara et al. | 349/160 |
| 4,861,143 A | 8/1989 | Yamazaki et al. | |
| 4,904,060 A * | 2/1990 | Grupp | 349/162 |
| 5,321,538 A | 6/1994 | Maruyama et al. | |
| 5,381,256 A | 1/1995 | Hanyu et al. | |
| 5,500,750 A * | 3/1996 | Kanbe et al. | 349/42 |
| 5,526,149 A * | 6/1996 | Kanbe et al. | 349/113 |
| 5,663,778 A | 9/1997 | Konno et al. | |
| 5,684,551 A * | 11/1997 | Nakamura et al. | 349/99 |
| 5,691,791 A * | 11/1997 | Nakamura et al. | 349/113 |
| 5,949,507 A * | 9/1999 | Shimada et al. | 349/113 |
| 6,061,111 A * | 5/2000 | Kataoka et al. | 349/113 |
| 6,181,397 B1 | 1/2001 | Ichimura | |
| 6,208,395 B1 * | 3/2001 | Kanoh et al. | 349/113 |
| 6,327,009 B1 | 12/2001 | Ichimura | |
| 6,882,387 B2 | 4/2005 | Ichimura | |

FOREIGN PATENT DOCUMENTS

| | | |
|---|---|---|
| JP | 06230399 | 8/1994 |
| JP | 06-342153 | 12/1994 |
| JP | 07-198919 | 8/1995 |
| JP | 07-218906 | 8/1995 |
| JP | 09-059528 | 3/1997 |

* cited by examiner

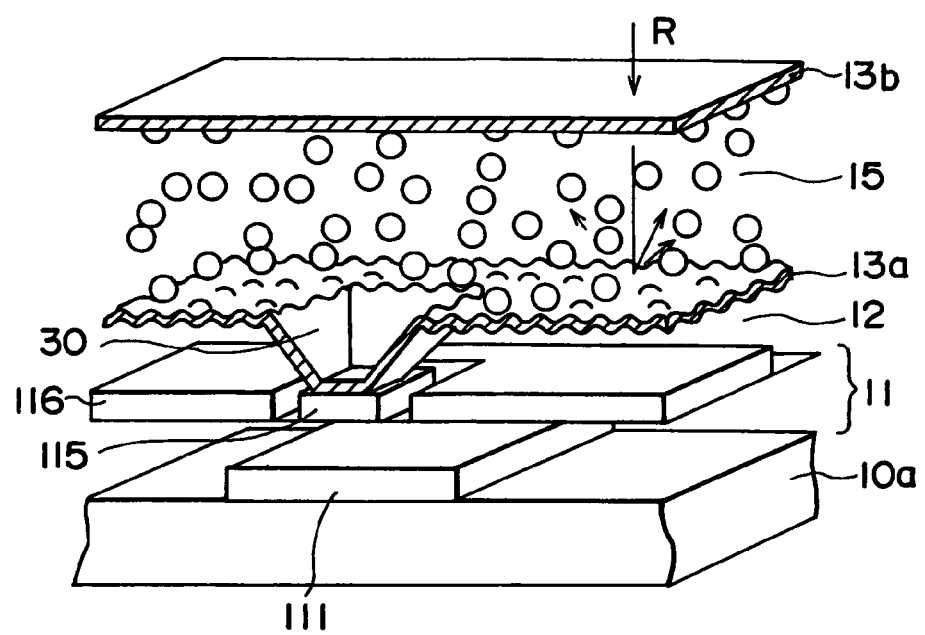
F I G. 6
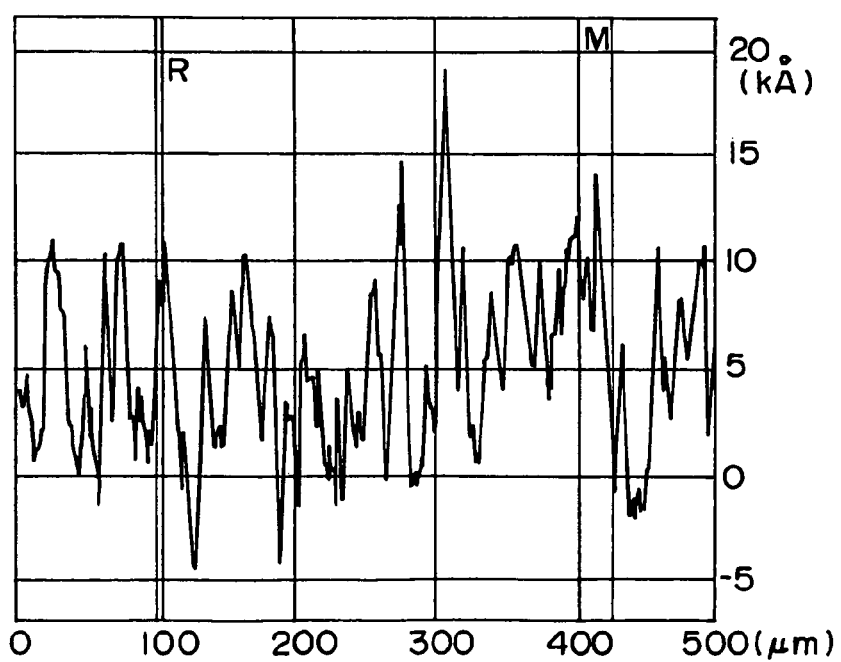
F I G. 7

REFLECTION-TYPE LIQUID CRYSTAL DISPLAY PANEL AND METHOD OF FABRICATING THE SAME

This is a divisional of prior application Ser. No. 09/992,062, filed on Nov. 5, 2001, now issued as Pat. No. 6,882,387, which is a divisional of prior application Ser. No. 09/421,103, filed on Oct. 19, 1999, now issued as Pat. No. 6,327,009, which is a divisional of prior application Ser. No. 09/048,754, filed on Mar. 25, 1998, now issued as Pat. No. 6,181,397, which is hereby incorporated by reference.

BACKGROUND OF THE INVENTION

1. Field of the Invention

The present invention relates to a reflection-type liquid crystal display panel and a method of fabricating the same. More particularly, the present invention relates to a reflection-type liquid crystal display panel suitable for use as a display unit for OA apparatus including note-size lap top personal computers and word processors, video apparatus including pocketable television sets, and game machines, and a method of fabricating the same.

2. Description of the Related Art

The application of liquid crystal display panels to pocketable liquid crystal television sets, lap top personal computers and word processors has rapidly developed in recent years. Particularly, reflection-type liquid crystal displays, which reflect incident external light to display images, are being watched with keen interest because reflection-type liquid crystal display panels do not need any backlight unit, are capable of operating at a low power consumption rate and of being powered by batteries; and are thin and of lightweight.

Generally known reflection-type liquid crystal display panels are TN liquid crystal display panels in which a liquid crystal is driven in a twisted nematic (TN) mode, and STN liquid crystal display panels in which a liquid crystal is driven in a super twisted nematic (STN) mode. The TN liquid crystal display panel displays monochromatic images by using the optical properties of a liquid crystal display panel, namely, an optically rotatory characteristic which is exhibited when no voltage is applied thereto and a polarization canceling characteristic which is exhibited when a voltage is applied thereto.

A dichromatic dye is added to a known amorphous chiral nematic guest-host liquid crystal, and the orientation of the liquid crystal is controlled by voltage to control the orientation of the dichromatic dye for displaying images. A liquid crystal display panel employing such a mixture of an amorphous chiral nematic guest-host liquid crystal and a dichromatic dye does not need any polarizing plate, and has a high luminance and a wide viewing angle.

A color liquid crystal display has a liquid crystal display panel provided with an R-, a G- and a B-filter therein, and displays multicolor or full-color images by utilizing an optical switching characteristic. Currently, TN reflection-type liquid crystal display panels are employed in portable liquid crystal television sets, namely, pocketable liquid crystal television sets, driven in an active matrix driving mode or a passive matrix driving mode.

Referring to FIG. 14 showing a conventional monochromatic reflection-type liquid crystal display panel 20 in a typical sectional view, the liquid crystal display panel 20 has a back glass substrate 20a, a front glass substrate 20b disposed opposite to the back glass substrate 20a, an insulating layer 22 formed on the inner surface of the back glass substrate 20a, first electrodes 23a for forming pixels, formed on the insulating layer 22 in the pattern of stripes, an alignment film 24a formed on the insulating layer 22 so as to cover the first electrodes 23a, second electrodes 23b formed on the inner surface of the front glass substrate 20b in the pattern of stripes so as to extend perpendicularly to the first electrodes 23a, and an alignment film 24b formed on the inner surface of the front glass substrate 20b so as to cover the second electrodes 23b. The second electrodes 23b formed on the front glass substrate 20b are transparent electrodes, and the first electrodes 23a formed on the back glass substrate 20a are reflective electrodes of a conductive metal. The electrodes 23a and 23b of the glass substrates 20a and 20b are scanned in a passive matrix driving mode to display images on the liquid crystal display panel.

Referring to FIG. 15 showing a conventional monochromatic reflection-type liquid crystal display panel 20 in a typical sectional view, the liquid crystal display panel 20 has a back glass substrate 20a, a front glass substrate 20b disposed opposite to the back glass substrate 20a, an insulating layer 22 formed on the inner surface of the back glass substrate 20a, thin-film transistors (TFTs) 21 forming pixels and formed on the insulting layer 22, a matrix of electrodes 23a formed on the insulating layer 22, an alignment film 24a covering the TFTs and the electrodes 23a, a planar common electrode 23b formed on the inner surface of the front glass substrate 20b, and an alignment film 24b formed on the common electrode 23b. The common electrode 23b formed on the front glass substrate 20b is a transparent electrode, and the electrodes 23a formed on the back glass substrate 20a are reflective electrodes of a conductive metal.

The back glass substrate 20a and the front glass substrate are spaced a predetermined distance apart by a spacer, not shown, so as to form a space therebetween, and a liquid crystal, such as a guest-host liquid crystal, is filled in the space between the glass substrates 20a and 20b to form a liquid crystal layer 25, and the liquid crystal layer 25 is sealed in the space by a sealing member 26 attached to the peripheral parts of the glass substrates 20a and 20b.

The conventional reflection-type liquid crystal display panel is provided on its back surface with a reflecting plate of a metal, such as an aluminum plate, having a surface finished by grinding to provide the same with a light scattering property or a reflecting plate formed by depositing a metal, such as aluminum, by evaporation on a roughened surface of a base plate to provide the roughened surface with a light scattering property to secure a wide visual angle. Usually, the reflecting plate attached to the back surface of the liquid crystal display panel is omitted if reflective electrodes are employed. The reflection-type liquid crystal display panels 20 shown in FIGS. 14 and 15 are not provided with any reflecting plate on their back surfaces.

The foregoing conventional reflection-type liquid crystal display panel provided with the reflective electrodes having mirror surfaces reflects images of matters in front of the reflection-type liquid crystal display panel in a specular reflection mode and thereby the visibility of the screen of the reflection-type liquid crystal display panel is deteriorated.

SUMMARY OF THE INVENTION

Accordingly, it is a first object of the present invention to improve the visibility of a reflection-type liquid crystal display panel provided with electrodes having reflective surfaces by suppressing the reflection of matters in front of the reflection-type liquid crystal display panel in the reflective surfaces of the electrodes of the reflection-type liquid crystal display panel.

The image displaying performance of the foregoing conventional reflection-type liquid crystal display panel provided with the insulating layer over the entire inner surface of the glass substrate is deteriorated due to current leakage across the pixel electrodes if the insulating layer has a low surface resistivity.

Accordingly, it is a second object of the present invention to improve the image displaying performance of a reflection-type liquid crystal display panel provided with electrodes formed on an insulating layer.

According to a first aspect of the present invention, a reflection-type liquid crystal display panel comprises a flat, smooth substrate, an insulating layer formed on the inner surface of the substrate, and reflective electrodes formed on the insulating layer, in which the minute irregularities are formed in the surfaces of the insulating layer, the reflective electrodes are formed on the surface of the insulating layer so as to conform to the minute irregularities.

According to a second aspect of the present invention, a reflection-type liquid crystal display panel comprises a flat, smooth substrate, an insulating layer formed on the inner surface of the substrate, and reflective electrodes formed in a predetermined pattern on the insulating layer, in which the insulating layer is formed in substantially the same pattern as that of the reflective electrodes.

According to a third aspect of the present invention, a method of fabricating a reflection-type liquid crystal display panel comprising a flat, smooth substrate, an insulating layer formed on the inner surface of the substrate, and reflective electrodes formed on the insulating layer, comprises the steps of forming and drying an insulating, photosensitive resin layer over the inner surface of the substrate, exposing the dried photosensitive resin layer to light through a transparent mask having a surface provided with minute irregularities, subjecting the exposed photosensitive resin layer to a developing process and drying the developed photosensitive resin layer to form an insulating resin layer having a surface provided with minute irregularities, and depositing a metal in a reflective film on the surface of the insulating resin layer.

According to a fourth aspect of the present invention, a method of fabricating a reflection-type liquid crystal display panel comprising a substrate, TFTs formed on the inner surface of the substrate, an insulating layer formed on the inner surface of the substrate, and reflective electrodes formed on the insulating layer, comprises the steps of forming and drying an insulating, photosensitive resin layer over the inner surface of the substrate, exposing the dried photosensitive resin layer to light through a transparent mask having a surface provided with minute irregularities, exposing the photosensitive resin layer to light through a photomask provided with a contact hole pattern for forming contact holes, subjecting the exposed photosensitive resin layer to a developing process and drying the developed photosensitive resin layer to form an insulating resin layer having a surface provided with minute irregularities, and depositing a metal in a reflective film on the surface provided with the minute irregularities of the insulating resin layer.

According to a fifth aspect of the present invention, a method of fabricating a reflection-type liquid crystal display panel comprising a flat, smooth substrate, an insulating layer formed on the inner surface of the substrate, and a reflective electrode film formed on the insulating layer in an electrode pattern, comprises the steps of forming and drying an insulating, photosensitive resin layer over the inner surface of the substrate, exposing the dried photosensitive resin layer to light through a photomask having substantially the same pattern as the electrode pattern, subjecting the exposed photosensitive resin layer to a developing process and drying the developed photosensitive resin layer, depositing a metal in a reflective thin film on the surface of the insulating resin layer, and patterning the reflective thin film in the electrode pattern.

According to a sixth aspect of the present invention, a method of fabricating a reflection-type liquid crystal display panel comprising a substrate, TFTs formed on the inner surface of the substrate, an insulating layer formed on the inner surface of the substrate, and a reflective electrode film formed on the insulating layer in an electrode pattern, comprises the steps of forming and drying an insulating, photosensitive resin layer over the inner surface of the substrate, exposing the dried photosensitive resin layer to light through a photomask provided with a contact hole pattern for forming contact holes, subjecting the exposed photosensitive resin layer to a developing process and drying the developed photosensitive resin layer, and depositing a metal in a reflection-type metal film on the surface of the insulating resin layer, and patterning the reflective metal film in the electrode pattern.

The above and other objects, features and advantages of the present invention will become more apparent from the following description taken in connection with the accompanying drawings.

BRIEF DESCRIPTION OF THE DRAWINGS

FIG. 6 is a typical perspective view of a section including a contact hole of the reflection-type liquid crystal display panel shown in FIG. 2;

FIG. 7 is a graph showing measured surface roughness of a ground glass plate measured by a stylus-type profilometer;

DESCRIPTION OF THE PREFERRED EMBODIMENTS

A reflection-type liquid crystal display panel according to the present invention has a conductive metal thin film forming reflective electrodes and formed on an insulating resin layer formed on the inner surface of a back substrate and having a surface provided with minute irregularities. Therefore, the conductive metal thin film has a shape precisely conforming to the irregular surface of the insulating resin layer. Consequently, external light falling on the conductive metal thin film from the front side of the reflection-type liquid crystal display panel, namely, incident light, is reflected irregularly and scattered, so that the reflection of external matters in the reflection-type liquid crystal display panel is suppressed. Reflection-type liquid crystal display panels embodying the present invention and method of fabricating those liquid crystal display panels will be described hereafter with reference to the accompanying drawings.

Figure 1:
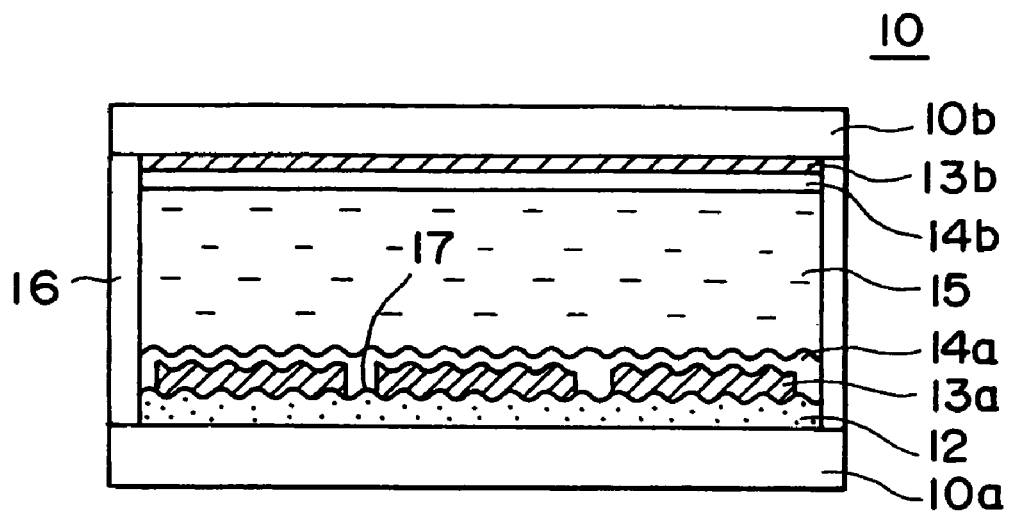
FIG. 1 is a typical sectional views of a reflection-type liquid crystal display panel in a first embodiment according to the present invention.

Referring to FIG. 1 showing a reflection-type liquid crystal display panel 10 in a first embodiment according to the present invention, a back substrate 10a, such as a glass substrate, and a front substrate 10b, such as a glass substrate, are disposed opposite to each other; an insulating layer 12 is formed over the inner surface of the back substrate 10a; first electrodes 13a, namely, pixel electrodes, are formed on the insulating layer 12 in the pattern of a spaced stripes; and an alignment film 14a is formed over the insulating layer 12 so as to cover the first electrodes 13a. Second electrodes 13b are formed on the inner surface of the front substrate 10b in the pattern of stripes perpendicular to the first electrodes 13a, and an alignment film 14b is formed on the inner surface of the front substrate 10b so as to cover the second electrodes 13b. The second electrodes 13b on the front substrate 10b are transparent electrodes. The first electrodes 13a are reflective electrodes of a conductive metal for effective reflection. Although dependent on the size of the panel and the number of pixels, the pitch of those electrodes usually is on the order of 200 µm.

The surface of the insulating layer 12 on which the first electrodes 13a are formed is provided with minute irregularities 17. Since the first electrodes 13a are formed by sputtering or the like in a small thickness of 1 µm or below, the shape of the surfaces of the first electrodes 13a conforms to the irregular surface of the insulating layer 12 underlying the first electrodes 13a. Since the first electrodes 13a have minutely irregular surfaces, external matters in front of the front substrate 10b of the reflection-type liquid crystal display panel will not be reflected in the liquid crystal display panel.

The minute irregularities are minute ridges and valleys of magnitudes capable of preventing the deterioration of the visibility of images displayed on the liquid crystal display panel by the specular reflection of external matters in the liquid crystal display panel. However, since the irregularities are dependent on the thickness of a liquid crystal layer 15, the thickness of the insulating layer 12 and the width of the first electrodes 13a, the magnitudes of the irregularities cannot be optionally determined. Usually, the thickness of the liquid crystal layer 15 is 10 µm or below, and is in the range of 1 to 2 µm if the liquid crystal layer 15 is formed of a ferroelectric liquid crystal. Since the thickness of the insulating layer 12 is on the order of several micrometers, the height of ridges of the irregularities is 10 µm at the maximum to the wavelengths (400 to 750 nm) of visible radiations, i.e., 0.4 to 0.75 µm, at the minimum.

Figure 2:
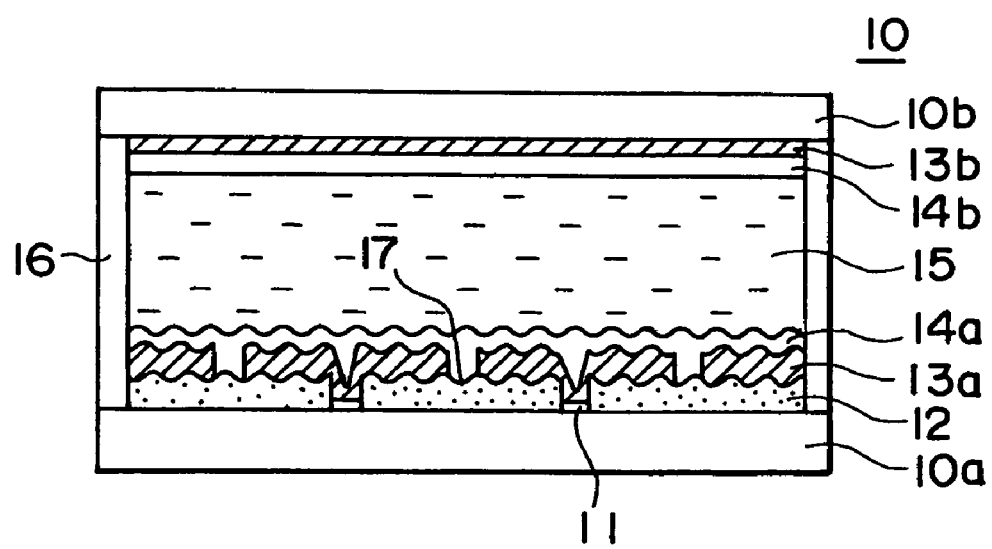
FIG. 2 is a typical sectional views of a reflection-type liquid crystal display panel in a second embodiment according to the present invention.

Referring to FIG. 2 showing a reflection-type liquid crystal display panel 10 in a second embodiment according to the present invention, a back substrate 10a and a front substrate 10b are disposed opposite to each other, an insulating layer 12 is formed over the inner surface of the back glass substrate 10a, TFTs 11 and first electrodes 13a for applying a voltage to a liquid crystal layer 15 are formed on the insulating layer 12, and an alignment film 14a is formed over the insulating layer 12 so as to cover the TFTs 11 and the first electrodes 13a. A flat common electrode 13b is formed on the inner surface of the front substrate 10b, and an alignment film 14b is formed on the inner surface of the front substrate 10b so as to cover the common electrode 13b. The common electrode 13b on the front substrate 10b is a transparent electrode. The first electrodes 13a are reflective electrodes of a conductive metal for effective reflection. The surface of the insulating layer 12 on which the first electrodes 13a are formed is provided with minute irregularities 17. A method of forming the first electrodes 13a and the magnitudes of minute irregularities formed in the surfaces of the first electrodes 13a are the same as those in the reflection-type liquid crystal display panel in the first embodiment.

The insulating layer 12 insulates the first electrodes 13a from each other and there is no particular restriction on material for forming the insulating layer 12. However, it is desirable that minute irregularities 17 can be formed in the surface of the insulating layer 12 by a simple process. Usually, a positive photosensitive resin which exhibits an insulating property when dried is a suitable material for forming the insulating layer 12. If the minute irregularities 17 are formed by a mechanical means, such as sandblasting, the insulating layer 12 need not be formed of a photosensitive material, but may be formed of an ordinary insulating material, such as a polymeric material or silicon dioxide.

As is generally known, the back substrate 10a and the front substrate 10b are spaced a predetermined distance apart by a spacer so as to form a space between the alignment films 14a and 14b formed respectively on the back glass substrate 10a and the front substrate 10b, and a liquid crystal is filled in the space between the alignment films 14a and 14b to form a liquid crystal layer 15, and the liquid crystal layer 15 is sealed in the space by a sealing member 16 attached to the peripheral parts of the substrates 10a and 10b.

Figure 5A:
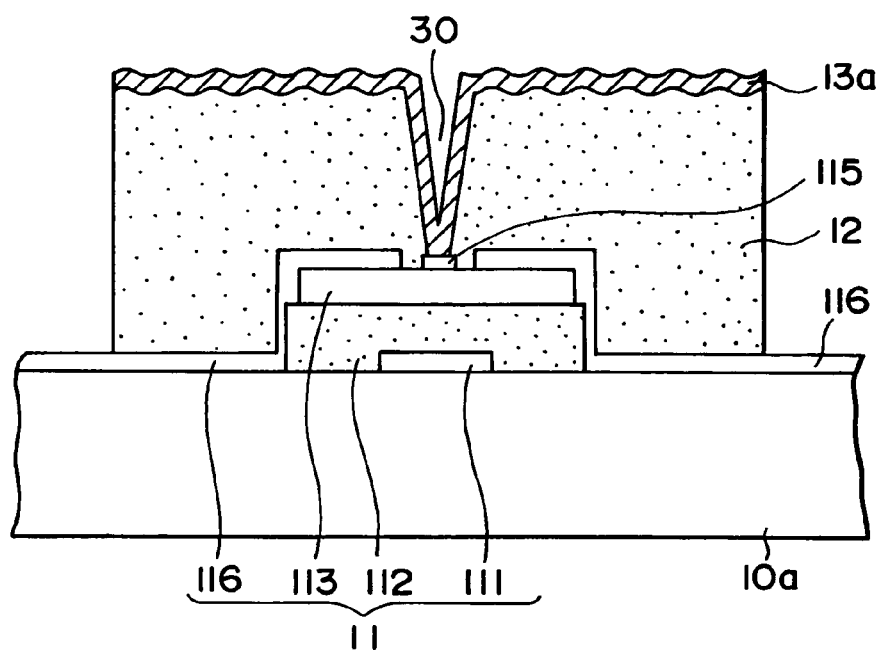
FIG. 5A is an enlarged typical sectional view of a portion including a contact hole of the reflection-type liquid crystal display panel shown in FIG. 2, taken on line VA-VA in FIG. 5B.
Figure 5B:
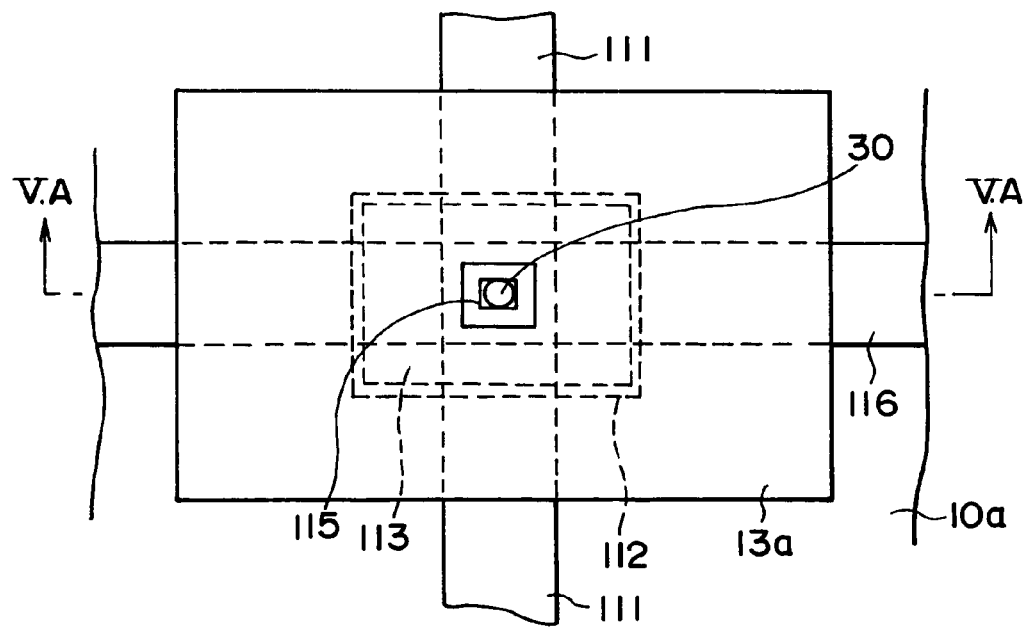
FIG. 5B is a typical plan view of the portion of the reflection-type liquid crystal display panel shown in FIG. 5A.

FIG. 5A is an enlarged typical sectional view of a portion including a contact hole of the reflection-type liquid crystal display panel in the second embodiment shown in FIG. 2, taken on line VA-VA in FIG. 5B, and FIG. 5B is a typical plan view of the portion of the reflection-type liquid crystal display panel shown in FIG. 5A. Referring to FIGS. 5A and 5B, each of the TFTs 11 formed on the back substrate 10a is constituted of an insulating layer 112 of silicon nitride ($SN_x$), a semiconductor layer 113 of amorphous silicon (a-Si), a gate electrode 111, a source electrode 116, and a drain electrode 115 connected to the first electrode 13a. Usually, the gate electrodes 111 and the source electrode 116 are formed perpendicularly to each other so as to form a matrix on the back substrate 10a.

In this reflection-type liquid crystal display panel, the first electrodes 13a are connected through contact holes 30 formed in the insulating layer 12 to the drain electrodes 115. Referring to FIG. 6 showing a portion of the reflection-type liquid crystal display panel in the second embodiment around one of the contact holes 30, the first electrode 13a is connected through the contact hole 30 formed in the insulating layer 12 to the drain electrode 115. The first electrode 13a has a surface of a shape conforming to the irregularities 17 formed in the surface of the insulating layer 12 to reflect incident light rays R falling thereon irregularly. Preferably, the liquid crystal layer 15 is formed of a guest-host liquid crystal or a polymer dispersion liquid crystal (PDLC).

Figure 3A:
FIGS. 3A to 3F are typical sectional views explaining a method of fabricating the reflection-type liquid crystal display panel shown in FIG. 1.

A method of fabricating the reflection-type liquid crystal display panel in the first embodiment of the present invention will be described with reference to FIGS. 3A to 3F. As shown in FIG. 3A, the back substrate 10a on which the reflective first electrodes 13a are to be formed is made. The back substrate 10a may be a reflective substrate. The back substrate 10a must be transparent if a reflecting layer is to be formed on its back surface. Generally, the back substrate 10a is a flat, smooth glass plate.

The present invention is characterized by forming the reflective first electrodes 13a on the insulating layer 12 of a resin having a surface provided with the minute irregularities 17 and formed on the back substrate 10a. There are some possible methods of forming the minute irregularities 17. One of the methods of forming the minute irregularities 17 comprises the steps of forming a positive photosensitive resin layer on the inner surface of the back substrate 10a, prebaking and drying the positive photosensitive resin layer, closely superposing a flat transparent sheet provided with minute irregularities on the photosensitive resin layer, exposing the photosensitive resin layer to light through the flat transparent sheet to produce minute irregularities on the photosensitive resin layer. The flat transparent sheet having a surface provided with minute irregularities may be a ground glass sheet or a mat-finished plastic sheet.

Figure 3B:
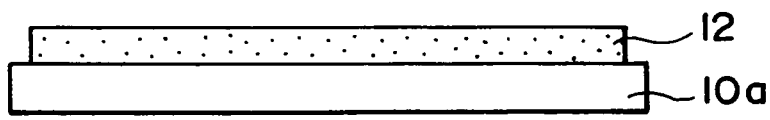
Figure 3C:
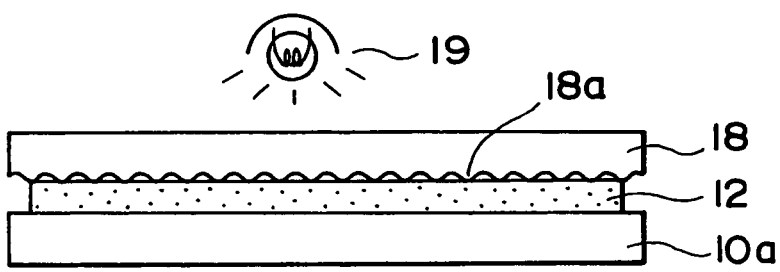
Figure 3D:
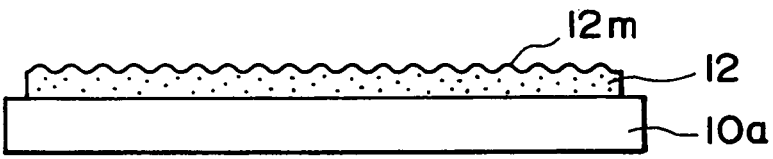

Then, as shown in FIG. 3B, a positive photosensitive resin film for forming the insulating layer 12 is formed over the inner surface of the back substrate 10a. The positive photosensitive resin film is exposed to light emitted by a light source 19 through a flat transparent sheet 18 provided with minute irregularities 18a as shown in FIG. 3C. The thus exposed positive photosensitive resin film is subjected to a developing step. Consequently, portions of the positive photosensitive resin film exposed to light and dissolvable in a developer are removed and the minute irregularities 12m are formed in the positive photosensitive resin film to complete the insulating layer 12 as shown in FIG. 3D. When the positive photosensitive resin film is exposed to light through the transparent sheet 18 provided with the minute irregularities 18a and the exposed positive photosensitive resin film is developed, the minute irregularities 12m formed in the surface of the insulating layer 12 is not necessarily exactly similar to the minute irregularities 18a of the transparent film 18. However, it is considered that ridges among the minute irregularities 18a of the transparent film 18 concentrate light rays and hence portions of the positive photosensitive resin film corresponding to the ridges among the minute irregularities 18a become more soluble than the rest of the positive photosensitive resin film, so that the minute irregularities 12m are formed in the surface of the insulating layer 12 in a shape substantially complementary to the minute irregularities 18a.

Materials suitable for forming the positive photosensitive resin film are, for example, a mixture of a cresol novolac resin soluble in an alkaline solution and naphthoquinone azide, and photosensitive acrylic resins. More specifically, materials suitable for forming the positive photosensitive resin film are, for example, OFPR-800, OFPR-5000, OFPR-8600, TSMR-8800 and TSMR-CRB commercially available from Tokyo Oka Kogyo K.K. of Japan, AND Optomer-PC302 commercially available from Japan Synthetic Rubber Co., Ltd. of Japan.

Figure 3E:
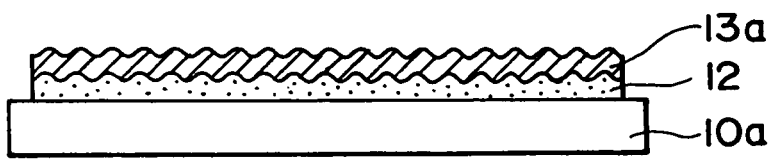
Figure 3F:
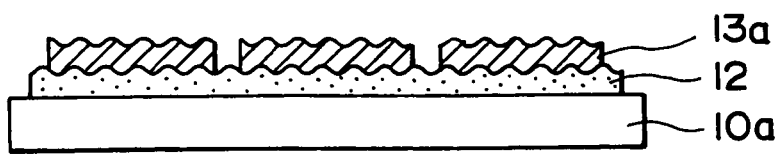

As shown in FIG. 3E, a film of a conductive metal is formed on the surface of the insulating layer 12 provided with the minute irregularities 12m to form the first electrodes 13a. Usually, the film of a conductive metal is an aluminum thin film formed by sputtering or the like. Since the conductive metal thin film, i.e., an aluminum thin film, is formed in a thickness of 1 μm or below, the shape of the surface of the conductive metal thin film is substantially the same as that of the surface of the insulating layer 12 provided with the minute irregularities 12m. The conductive metal thin film is patterned by an ordinary photoetching process to form the first electrodes 13a in the shape of stripes as shown in FIG. 3F. In FIG. 3F, the first electrodes 13a extend perpendicularly to the sheet of paper.

The alignment films 14a and 14b are formed respectively on the substrates 10a and 10b, the substrates 10a and 10b are combined together so as to form a space therebetween, a PDLC or a guest-host liquid crystal is filled and sealed in the space between the substrates 10a and 10b to complete the reflection-type liquid crystal display panel shown in FIG. 1.

Figure 4A:
FIGS. 4A to 4G are typical sectional views explaining a method of fabricating the reflection-type liquid crystal display panel shown in FIG. 2.

A method of fabricating the reflection-type liquid crystal display panel in the second embodiment of the present invention will be described with reference to FIGS. 4A to 4G. As shown in FIG. 4A, the back substrate 10a on which the reflective first electrodes 13a are to be formed is prepared. The back substrate 10a is provided with the TFTs 11 on its inner surface. The back substrate 10a may be a reflective substrate. The back substrate 10a must be transparent if a reflecting layer is to be formed on its back surface. Generally, the back substrate 10a is a flat, smooth glass plate. The reflective first electrodes 13a, similarly to those of the first embodiment, are formed on the insulating layer 12 of a resin having a surface provided with the minute irregularities 17 and formed on the back substrate 10a. The minute irregularities 17 are formed by the same method as that employed in forming the minute irregularities 17 of the first embodiment.

Figure 4B:
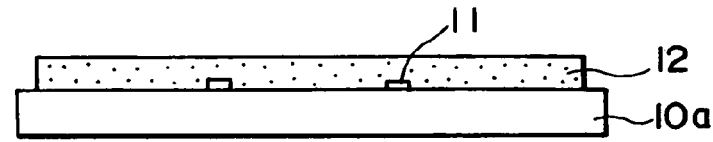
Figure 4C:
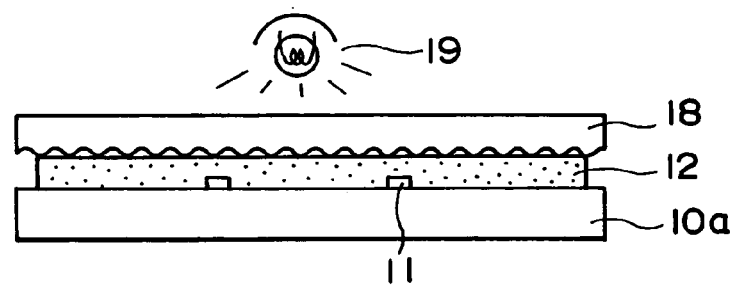
Figure 4D:
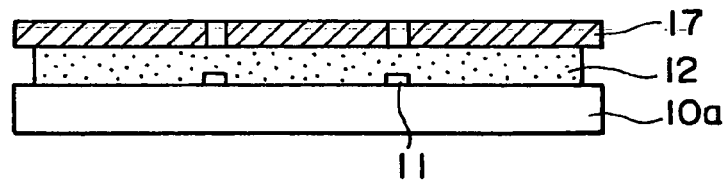
Figure 4E:
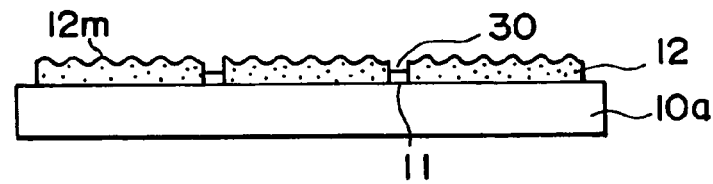

A positive photosensitive resin film is formed on the inner surface of the back substrate 10a as shown in FIG. 4B. A flat transparent sheet 18 provided with minute irregularities is superposed on the positive photosensitive resin film, and the photosensitive resin film is exposed to light emitted by a light source 19 through the flat transparent sheet 18 as shown in FIG. 4C. A photomask 17 provided with transparent parts at positions corresponding to the TFTs 11 is superposed on the positive photosensitive resin film as shown in FIG. 4D and the positive photosensitive resin film is exposed to light through the photomask 17 to form contact holes 30 in the positive photosensitive resin film as shown in FIG. 4E. Then the thus exposed positive photosensitive resin film is subjected to a developing step. Consequently, portions of the positive photosensitive resin film exposed to light and dissolvable in a developer are removed and the minute irregularities 12m and the contact holes 30 are formed in the positive photosensitive resin film to complete the insulating layer 12 as shown in FIG. 4E.

Figure 4F:
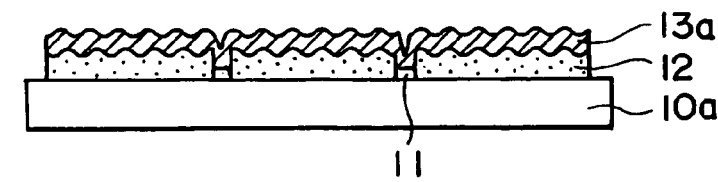
Figure 4G:
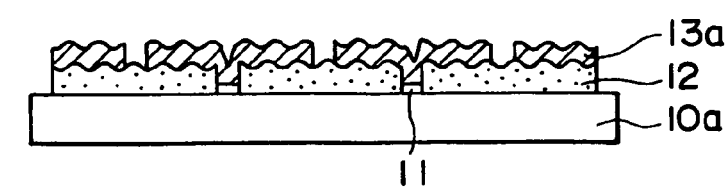

A film of a conductive metal is formed on the surface of the insulating layer 12 provided with the minute irregularities 12m as shown in FIG. 4F to form the first electrodes 13a. Usually, the film of a conductive metal is an aluminum thin film formed by sputtering or the like. Since the conductive metal thin film, i.e., an aluminum thin film, is formed in a thickness of 1 µm or below, the shape of the surface of the conductive metal thin film is substantially exactly the same as that of the surface of the insulating layer 12 provided with the minute irregularities 12m. The conductive metal thin film is deposited also in the contact holes 30 to connect the drain electrodes of the TFTs to the first electrodes 13a. The conductive metal thin film is patterned by an ordinary photoetching process to form the first electrodes 13a in a matrix as shown in FIG. 4G.

The alignment films 14a and 14b are formed respectively on the substrates 10a and 10b, the substrates 10a and 10b are combined together so as to form a space therebetween, a PDLC or a guest-host liquid crystal is filled and sealed in the space between the substrates 10a and 10b to complete the reflection-type liquid crystal display panel shown in FIG. 2.

EXAMPLE 1

A passive matrix reflection-type liquid crystal display panel in Example 1 will be described hereinafter.
(Back Panel)
A positive photosensitive acrylic resin (Optomer PC302 available from Japan Synthetic Rubber Co., Ltd.) was spread by a spin coating method (Rotational speed: 1500 rpm) on a flat glass substrate (Glass 7059 available from Corning Inc.) in a positive photosensitive film of about 1.5 µm in thickness for forming an insulating layer 12 as shown in FIG. 3B. Then, the glass substrate was heated at 80° C. for 60 sec on a hot plate for prebaking.

A ground glass plate 18 (Ground Glass #1500 available from Koei Kagaku K.K.) having a irregular surface was put on the positive photosensitive film with the irregular surface thereof in close contact with the surface of the positive photosensitive film, and then the positive photosensitive film was exposed to light emitted by an extra-high pressure mercury lamp (Power: 15 mW/cm$^2$, Wavelength: 405 nm) for 3 seconds (FIG. 3C).

Subsequently, the exposed positive photosensitive film was immersed in a developing solution prepared by diluting PD523AD, a developer available from Japan Synthetic Rubber Co., Ltd., 11.9 times for 90 seconds for development (FIG. 3D). The entire surface of the positive photosensitive film was exposed to light emitted by an extra-high pressure mercury lamp (Power: 15 mW/cm$^2$, Wavelength: 405 nm) for 30 seconds and then the positive photosensitive film was heated at 220° C. for 60 minutes in an oven for postbaking. Consequently, an insulating layer 12 provided in its surface with minute irregularities 12m substantially complementary to the minute irregularities of the ground glass plate was completed.

A 0.2 µm thick aluminum thin film was deposited by a sputtering process over the insulating layer 12 as shown in FIG. 3E, and the aluminum thin film was patterned by using a photomask to form stripe-shaped, 190 µm wide first electrodes 13a at intervals of 200 pm as shown in FIG. 3F to complete a back panel.

FIG. 7 is a graph showing measured surface roughness of the ground glass plate measured by a stylus-type profilometer (Dektak 16000 available from Dektak Inc.). A range of 500 µm was measured. The arithmetical average Ra of the surface roughness of the ground glass plate was 3192 Å (about 0.3 µm), and the maximum height $R_{max}$ of ridges (maximum depth of valleys) was about 22,000 Å0 (about 2.2 µm). In FIG. 7, indicated at R is a position (106.38 µm) where the sampling of measured data for calculation is started and at M was a position (425.53 µm) where the sampling of measured data for calculation was ended.

(Front Panel)
A 0.15 µm thick ITO film was deposited in stripes on a transparent glass substrate (Glass 7059 available from Corning Inc.), i.e., a front substrate 10b, by a sputtering process to form transparent electrodes to be extended perpendicularly to the first electrodes 13a of the back substrate 10a to complete a front panel.

(Assembly of Liquid Crystal Display Panel)
Alignment films were formed on the inner surfaces of the front substrate 10b and the back substrate 10a, the front panel and the back panel were disposed opposite to each other so as to form a space therebetween, and a guest-host liquid crystal was filled and sealed in the space between the front and the back panel to complete a liquid crystal display panel. When the reflection-type liquid crystal display panel was driven, the liquid crystal display panel lighted in white and displayed images in satisfactory visibility.

COMPARATIVE EXAMPLE 1

A liquid crystal display panel in Comparative example 1 was fabricated by processes similar to those by which the liquid crystal display panel in Example 1 was fabricated. The insulating layer of the liquid crystal display panel in Comparative Example 1 was the same in material and thickness as the insulating layer of the liquid crystal display panel in Example 1, but minute irregularities were not formed in the surface of the insulating layer of the liquid crystal display panel in Comparative example 1, and hence the first electrodes formed on the insulating layer having a smooth surface had specular surfaces. Other conditions for the fabrication of the liquid crystal display panel in Comparative Example 1 were the same as those for the fabrication of the liquid crystal display panel in Example 1. The first electrodes having the specular surfaces reflected light intensely and the visibility of images displayed on the liquid crystal display panel in Comparative Example 1 was inferior to that of images displayed on the liquid crystal display panel in Example 1.

EXAMPLE 2

A TFT reflection-type liquid crystal display panel in Example 2 will be described hereinafter.
(Back Panel)
A positive photosensitive acrylic resin (Optomer PC302 available from Japan Synthetic Rubber Co., Ltd.) was spread by a spin coating method (Rotational speed: 1500 rpm) on a flat glass substrate (Glass 7059 available from Corning Inc.) provided with TFTs on its inner surface in a positive photosensitive film of about 1.5 µm in thickness for forming an insulating layer 12 as shown in FIG. 4B. Then, the glass substrate was heated at 80° C. for 60 seconds on a hot plate for prebaking.

A ground glass plate 18 (Ground Glass #1500 available from Koei Kagaku K.K.) having the same irregular surface as that of the ground glass plate employed in fabricating Example 1 was put on the positive photosensitive film with the irregular surface thereof in close contact with the surface of the positive photosensitive film, and then the positive photosensitive film was exposed to light emitted by an extra-high pressure mercury lamp (Power: 15 mW/cm$^2$, Wavelength: 405 nm) for 3 seconds (FIG. 4C).

Subsequently, a photomask 17 provided with a contact hole pattern for forming contact holes was superposed on the positive photosensitive resin film as shown in FIG. 4D and the positive photosensitive film was exposed to light emitted by an extra-high pressure mercury lamp (Power: 15 mW/cm$^2$, Wavelength: 405 nm) for 15 seconds through the photomask 17 to form contact holes 30 for connecting the drain electrodes of the TFTs to reflective first electrodes in the positive photosensitive film.

Then the exposed positive photosensitive film was immersed in a developing solution prepared by diluting PD523AD, a developer available from Japan Synthetic Rubber Co., Ltd., 11.9 times for 90 seconds for development (FIG. 4E). Then, the entire surface of the positive photosensitive film was exposed to light emitted by an extra-high pressure mercury lamp (Power: 15 mW/cm$^2$, Wavelength: 405 nm) for 30 seconds, and then the positive photosensitive film was heated in an oven at 220° C. for 60 minutes for postbaking. A 0.2 μm thick aluminum film was formed on the surface of the insulating layer 12 to form the first electrodes 13a by a sputtering process. The aluminum film was patterned by an ordinary patterning process to form the first electrodes 13a in a matrix as shown in FIG. 4G to complete a back panel.

(Front Panel)

A common electrode was formed by depositing a 0.15 μm thick ITO film over a surface of a transparent glass substrate (Glass 7059 available from Coring Inc.), i.e., a front substrate 10b, by a sputtering process to complete a front panel.

(Assembly of Liquid Crystal Display Panel)

Alignment films were formed on the inner surfaces of the front substrate 10b and the back substrate 10a, the front panel and the back panel were disposed opposite to each other so as to form a space therebetween, and a guest-host liquid crystal containing a dichromatic dye was filled and sealed in the space between the front and the back panel to complete a liquid crystal display panel. When the reflection-type liquid crystal display panel was driven, the liquid crystal display panel lighted in white and displayed images in satisfactory visibility.

COMPARATIVE EXAMPLE 2

A liquid crystal display panel in Comparative Example 2 was fabricated by processes similar to those by which the liquid crystal display panel in Example 2 was fabricated. The insulating layer of the liquid crystal display panel in Comparative Example 2 was the same in material and thickness as the insulating layer of the liquid crystal display panel in Example 2, but minute irregularities were not formed in the surface of the insulating layer of the liquid crystal display panel in Comparative Example 2, and hence the first electrodes formed on the insulating layer having a smooth surface had specular surfaces. Other conditions for the fabrication of the liquid crystal display panel in Comparative Example 2 were the same as those for the fabrication of the liquid crystal display panel in Example 2. The first electrodes having the specular surfaces reflected light intensely and the visibility of images displayed on the liquid crystal display panel in Comparative Example 2 was inferior to that of images displayed on the liquid crystal display panel in Example 2.

In the foregoing reflection-type liquid crystal display panels of the present invention, the first electrodes are provided in their surfaces with the minute irregularities. Therefore the specular reflection of images of external matters in front of the reflection-type liquid crystal display panels does not occur, the external matters are not reflected in the liquid crystal display panels, and hence the reflection-type liquid crystal display panels are capable of displaying images in satisfactory visibility.

The foregoing methods of fabricating a reflection-type liquid crystal display panel are capable of easily fabricating liquid crystal display panels capable of displaying images in satisfactory visibility.

Figure 8:
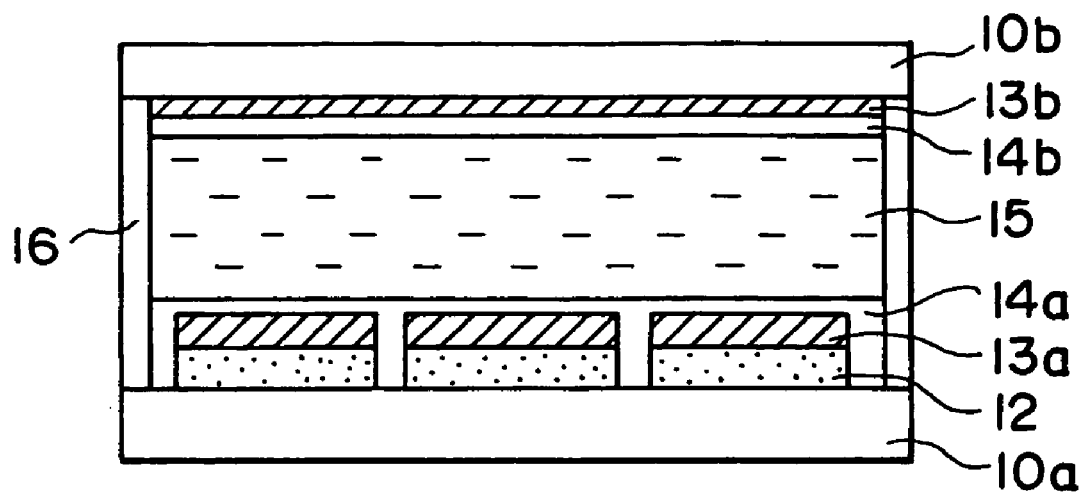
FIG. 8 is a typical sectional views of a reflection-type liquid crystal display panel in a third embodiment according to the present invention.

A reflection-type liquid crystal display panel 10 in a third embodiment according to the present invention will be described with reference to FIG. 8, in which parts like of corresponding to those of the first embodiment shown in FIG. 1 are designated by the same reference characters and the description thereof will be omitted. As shown in FIG. 8, the reflection-type liquid crystal display panel 10 has a back substrate 10a, such as a glass substrate, and a front substrate 10b, such as a glass substrate, disposed opposite to each other.

The reflection-type liquid crystal display panel in the third embodiment is featured by the pattern of an insulating layer 12 underlying first electrodes 13a being substantially the same as that of the first electrodes 13a. The pattern of the insulating layer being substantially the same as that of the first electrodes 13a signifies that the insulating layer 12 is divided in isolated portions respectively corresponding to the first electrodes 13a and does not mean that the respective patterns of the insulating layer 12 and the first electrodes 13a are not perfectly identical. Since the insulating layer 12 is divided into the isolated portions, and the first electrodes 13a are formed respectively on the isolated portions of the insulating layer 12, current leakage between the first electrodes 13a can be suppressed.

Figure 9:
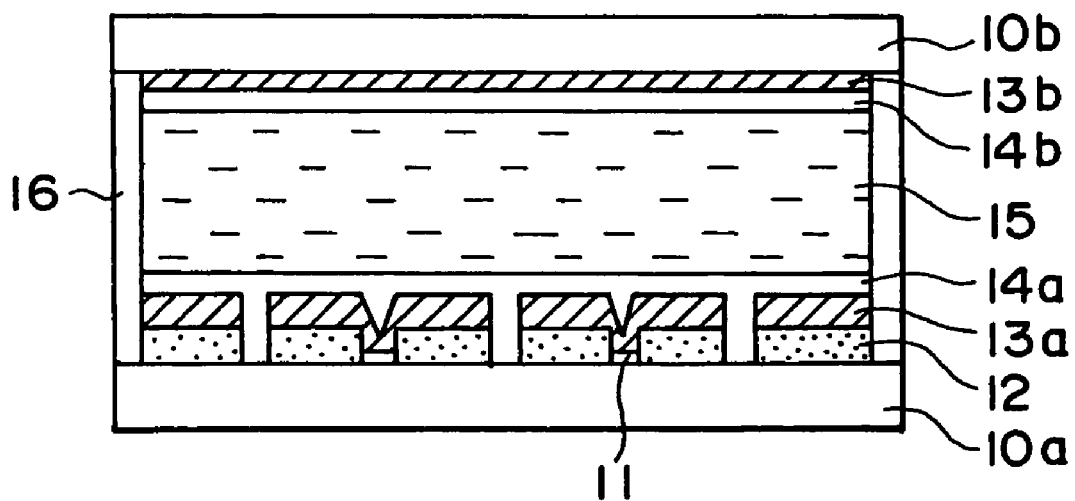
FIG. 9 is a typical sectional views of a reflection-type liquid crystal display panel in a fourth embodiment according to the present invention.

A reflection-type liquid crystal display panel 10 in a fourth embodiment according to the present invention will be described with reference to FIG. 9, in which parts like of corresponding to those of the third embodiment shown in FIG. 8 are designated by the same reference characters and the description thereof will be omitted. As shown in FIG. 9, the reflection-type liquid crystal display panel 10 has a back substrate 10a, such as a glass substrate, and a front substrate 10b, such as a glass substrate, disposed opposite to each other. TFTs for applying voltage to a liquid crystal are arranged on the inner surface of the front substrate 10b, an insulating layer 12 is formed on the inner surface of the back substrate 10a, and first electrodes 13a are formed on the insulating layer 12.

The liquid crystal display panel in the fourth embodiment is featured by the pattern of the insulating layer 12 underlying first electrodes 13a being substantially the same as that of the first electrodes 13a. Since the insulating layer 12 is divided into the isolated portions, and the first electrodes 13a are formed respectively on the isolated portions of the insulating layer 12, current leakage between the first electrodes 13a can be suppressed.

Reflection-type liquid crystal display panels 10 in fifth and sixth embodiments according to the present invention will be described with reference to FIGS. 10 and 11, in which parts like of corresponding to those of the third and the fourth embodiment shown in FIGS. 8 and 9 are designated by the same reference characters and the description thereof will be omitted.

The liquid crystal display panels in the fifth and the sixth embodiment are substantially the same in configuration as those in the third and the fourth embodiment shown in FIGS. 8 and 9, except that insulating layers 12 and the first electrodes 13*a* of the reflection-type liquid crystal display panels in the fifth and the sixth embodiment, similarly to those of the liquid crystal display panels in the first and the second embodiment shown in FIGS. 1 and 2, are provided in their surfaces with minute irregularities.

Figure 12A:
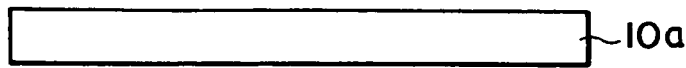
FIGS. 12A to 12G are typical sectional views explaining methods of fabricating the reflection-type liquid crystal display panels in the third and the fifth embodiment according to the present invention.
Figure 12B:
Figure 12C:
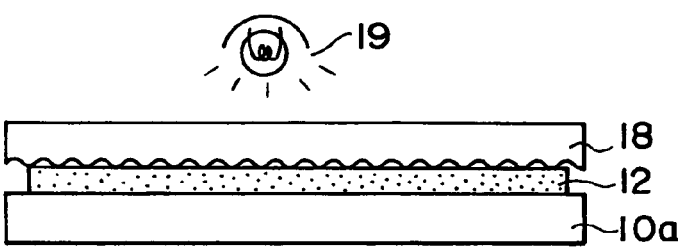
Figure 12D:
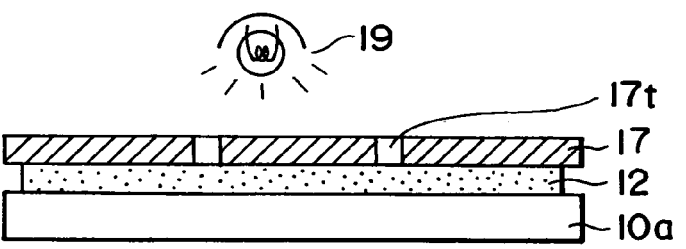
Figure 12E:
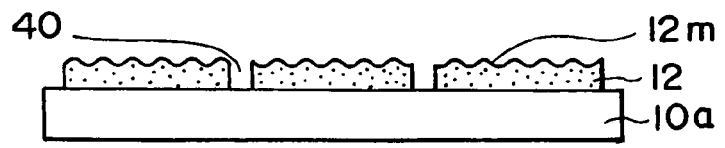
Figure 12F:
Figure 12G:
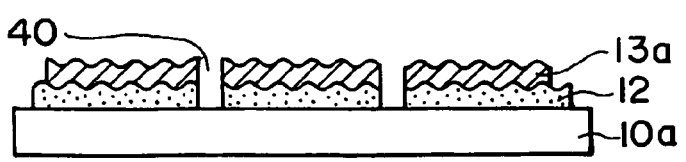

FIGS. 12A to 12G are views explaining methods of fabricating the reflection-type liquid crystal display panels in the third and the f if th embodiment. More precisely, FIGS. 12A to 12G are views explaining a method of fabricating the liquid crystal display panel in the fifth embodiment because the first electrodes 13*a* has surfaces provided with minute irregularities as shown in FIG. 12G. However the method of fabricating the liquid crystal display panel in the third embodiment is similar to that of fabricating the liquid crystal display panel in the fifth embodiment only except that the former has no step corresponding to that shown in FIG. 12C.

The back substrate 10*a* may be a reflective substrate. The back substrate 10*a* must be transparent if a reflecting layer is to be formed on its back surface. Generally, the back substrate 10*a* is a flat, smooth glass plate.

The present invention is characterized by forming the reflective first electrodes 13*a* on the insulating layer 12 of a resin having a surface provided with the minute irregularities 17 and formed on the back substrate 10*a*. There are some possible methods of forming the minute irregularities 17. As mentioned previously, one of the methods of forming the minute irregularities 17 comprises the steps of forming a positive photosensitive resin layer on the inner surface of the back substrate 10*a*, prebaking and drying the positive photosensitive resin layer, closely superposing a flat transparent sheet provided with minute irregularities on the photosensitive resin layer, exposing the photosensitive resin layer to light through the flat transparent sheet to produce minute irregularities on the photosensitive resin layer. The flat transparent sheet having a surface provided with the minute irregularities may be a ground glass sheet or a mat-finished plastic sheet.

Then a positive photosensitive film for forming the insulating layer 12 is formed over the inner surface of the back substrate 10*a* as shown in FIG. 12B. The positive photosensitive film is exposed to light emitted by a light source 19 through a flat transparent sheet 18 provided with minute irregularities as shown in FIG. 12C. When the positive photosensitive film is exposed to light through the transparent sheet 18 provided with the minute irregularities, the minute irregularities 12*m* formed in the surface of the insulating layer 12 is not necessarily exactly similar to the minute irregularities of the transparent film 18. However, as mentioned previously, it is considered that ridges among the minute irregularities of the transparent film 18 concentrate light rays and hence portions of the positive photosensitive film corresponding to the ridges among the minute irregularities become more soluble than the rest of the positive photosensitive film, so that the minute irregularities 12*m* are formed in the surface of the insulating layer 12 in a shape substantially complementary to the minute irregularities of the transparent film 18. This step of forming the minute irregularities 12*m* in the insulating layer 12 shown in FIG. 12C is omitted from the method of fabricating the liquid crystal display panel in the third embodiment, and hence the first electrodes 13*a* of the liquid crystal display panel in the third embodiment has flat surfaces.

As shown in FIG. 12D, the positive photosensitive film is exposed to light through a photomask 17*t*. The area of each of portions of the thus patterned insulating layer 12 may be either equal to or slightly larger than that of the first electrodes 13*a*. It is obvious that portions of the insulating layer 12 corresponding to marginal parts, i.e., peripheral parts around a display part of the liquid crystal display panel, and portions of the insulating layer 12 not having any connection with the shape of the first electrodes 13 need not have the same shape as the first electrodes 13. The thus exposed positive photosensitive film is subjected to a developing process. Consequently, portions of the positive photosensitive film exposed to light and dissolvable in a developer are removed and the minute irregularities 12*m* are formed in the positive photosensitive film to complete the insulating layer 12 as shown in FIG. 12E. It is obvious that the first electrodes 13 of the liquid crystal display panel in the third embodiment has flat surfaces because the method of fabricating the same does not include any step corresponding to that shown in FIG. 12C.

An aluminum thin film, i.e., a thin film of a conductive metal, is formed on the surface of the insulating layer 12 provided with the minute irregularities 12*m* to form the first electrodes 13*a* as shown in FIG. 12F. The aluminum thin film is patterned by an ordinary photoetching process to form the first electrodes 13*a* in the shape of stripes as shown in FIG. 12G. In FIG. 12G, the first electrodes 13*a* extend perpendicularly to the sheet of paper.

Figure 10:
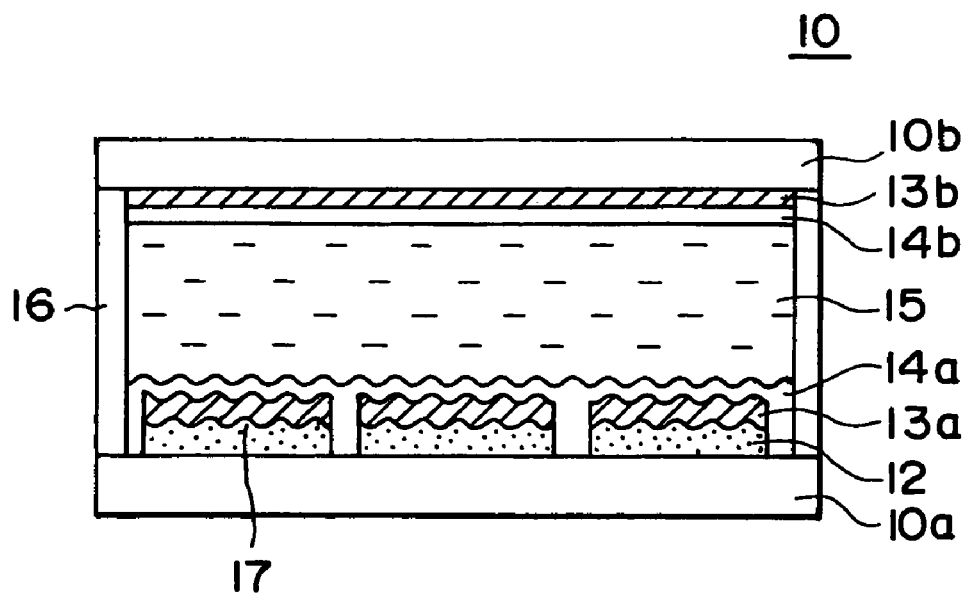
FIG. 10 is a typical sectional views of a reflection-type liquid crystal display panel in a fifth embodiment according to the present invention.

The alignment films 14*a* and 14*b* are formed respectively on the substrates 10*a* and 10*b*, the substrates 10*a* and 10*b* are combined together so as to form a space therebetween, a PDLC or a guest-host liquid crystal is filled and sealed in the space between the substrates 10*a* and 10*b* to complete the reflection-type liquid crystal display panel shown in FIG. 10 (FIG. 8).

Method of fabricating the reflection-type liquid crystal display panels in the fourth and the sixth embodiment of the present invention will be described with reference to FIGS. 13A to 13G. More precisely, FIGS. 13A to 13G, similarly to FIGS. 12A to 12G being views explaining the method of fabricating the liquid crystal display panel in the fifth embodiment, are views explaining a method of fabricating the reflection-type liquid crystal display panel in the sixth embodiment because the first electrodes 13*a* has surfaces provided with minute irregularities as shown in FIG. 13G.

Figure 13A:
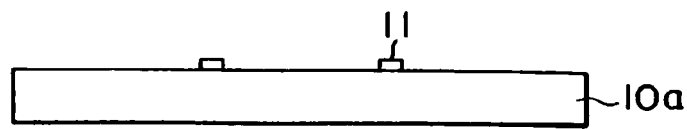
FIGS. 13A to 13G are typical sectional views explaining methods of fabricating the reflection-type liquid crystal display panels in the fourth and the sixth embodiment according to the present invention.

As shown in FIG. 13A, the back substrate 10*a* on which the reflective first electrodes 13*a* are to be formed is prepared. The back substrate 10*a* of the sixth (fourth) embodiment, differing from the back substrate 10*a* of the fifth (third) embodiment, is provided with the TFTs 11 on its inner surface. The back substrate 10*a* may be a reflective substrate. The back substrate 10*a* must be transparent if a reflecting layer is to be formed on its back surface. Generally, the back substrate 10*a* is a flat, smooth glass plate. In the sixth embodiment, the insulating layer 12, similarly to the insulating layer 12 of the fourth embodiment, is provided with minute irregularities in its surface, and the reflective first electrodes 13*a* are formed on the insulating layer 12 having the surface provided with the minute irregularities.

Figure 13B:
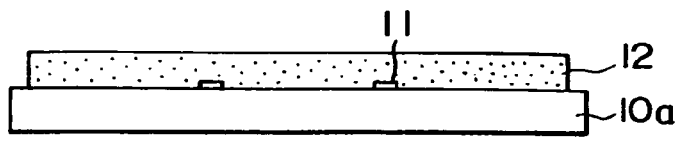
Figure 13C:
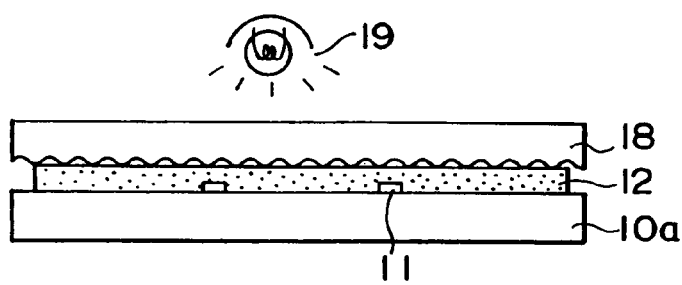
Figure 13D:
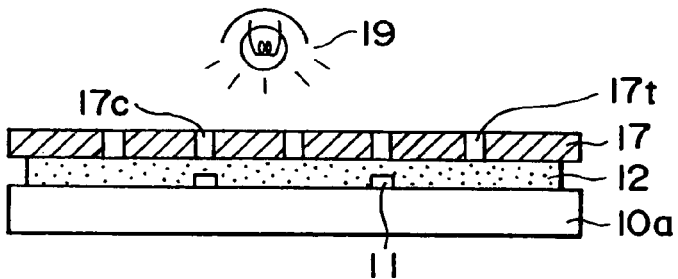
Figure 13E:
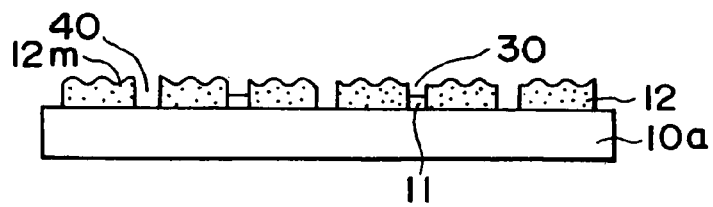
Figure 13F:
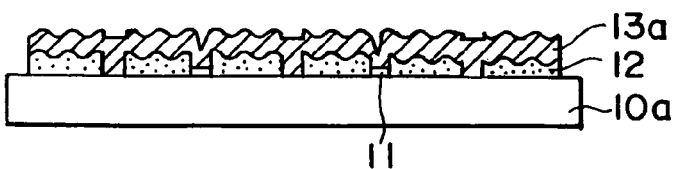
Figure 13G:
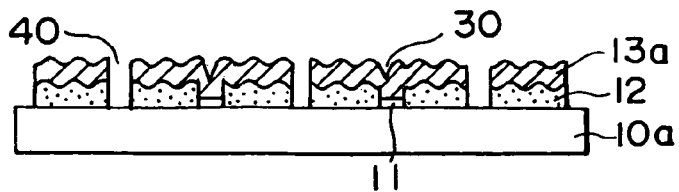
Figure 14:
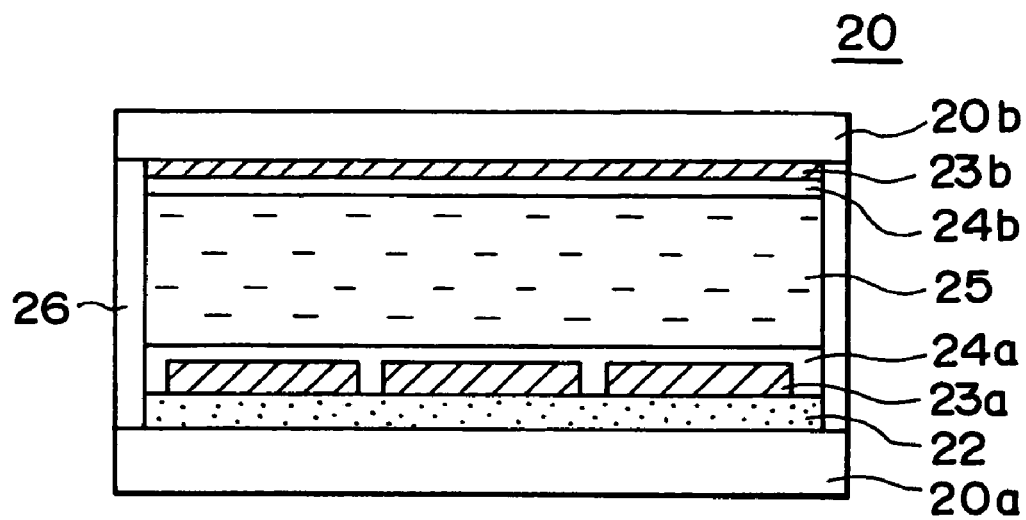
FIG. 14 is a typical sectional view of a conventional monochromatic reflection-type liquid crystal display panel.
Figure 15:
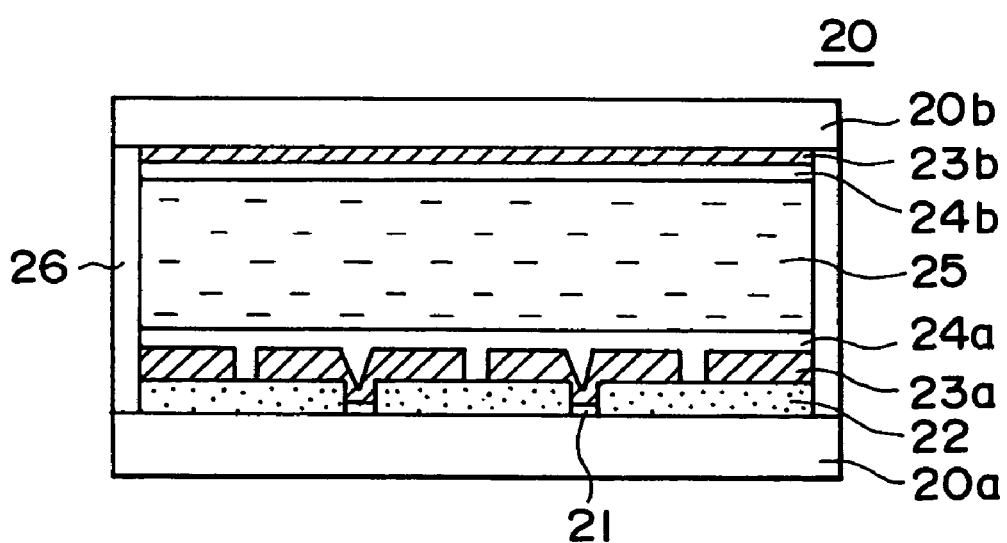
FIG. 15 is a typical sectional view of a conventional monochromatic reflection-type liquid crystal display panel employing TFTs.

A positive photosensitive film for forming the insulating layer 12 is formed over the inner surface of the back substrate 10a as shown in FIG. 13B. The positive photosensitive film is exposed to light emitted by a light source 18 through a flat transparent sheet 18 provided with minute irregularities as shown in FIG. 13C. The step shown in FIG. 13C is omitted for the reflection-type liquid crystal display panel in the fourth embodiment. Subsequently, the insulating layer 12 is exposed to light through a photomask 17 provided with a pattern 17t for forming isolated portions of the insulating layer 12 divided by spaces 40 and a contact hole pattern 17c for forming contact holes 30 for connecting the first electrodes 13a to the TFTs 11 as shown in FIG. 13D. After the exposure steps illustrated in FIGS. 13C and 13D (only the exposure step illustrated in FIG. 13D for the fourth embodiment), the exposed positive photosensitive film is subjected to a developing step to remove exposed, dissolvable portions of the positive photosensitive film. Consequently, the insulating layer 12 provided in its surface with the minute irregularities 12m, divided into isolated portions by the spaces 40, and provided with the contact holes 30 at positions corresponding to the TFTs 11 is formed as shown in FIG. 13E. The positive photosensitive film may be exposed to light by two exposure steps, i.e., an exposure step employing a photomask provided with the pattern 17t, and an exposure step employing the photomask provided with the contact hole pattern 17c. Either the exposure step employing the photomask provided with the pattern 17t or the exposure step employing the photomask provided with the contact hole pattern 17c may be executed first.

An aluminum thin film, i.e., a thin film of a conductive metal, for forming the first electrodes 13a is formed over the surface of the insulating layer 12 provided with the minute irregularities 12m. The aluminum thin film is subjected to an ordinary photoetching step to form the first electrodes 13a in a matrix as shown in FIG. 13G.

Figure 11:
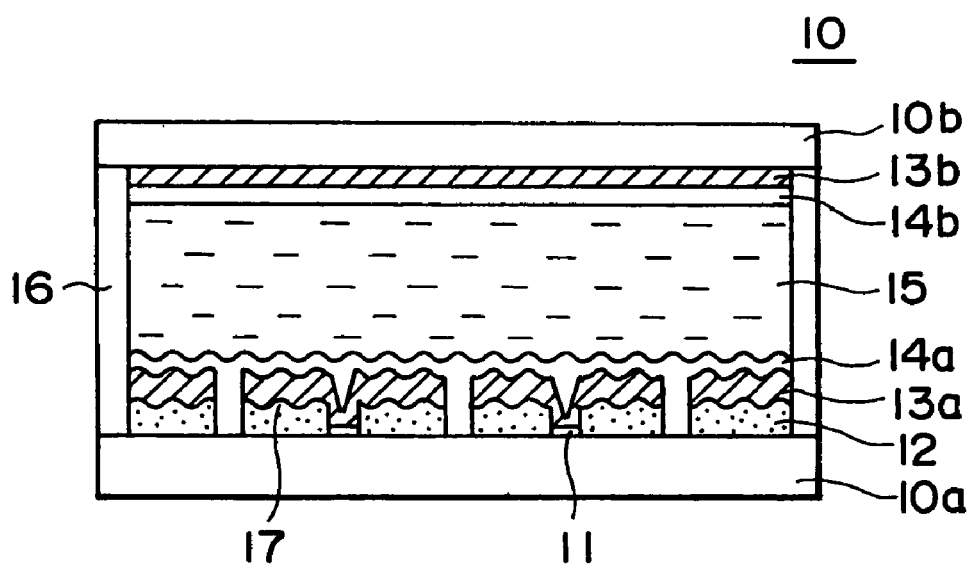
FIG. 11 is a typical sectional views of a reflection-type liquid crystal display panel in a sixth embodiment according to the present invention.

Then, the alignment films 14a and 14b are formed respectively on the substrates 10a and 10b, the substrates 10a and 10b are combined together so as to form a space therebetween, a PDLC or a guest-host liquid crystal is filled and sealed in the space between the substrates 10a and 10b to complete the reflection-type liquid crystal display panel shown in FIG. 11 (FIG. 9).

EXAMPLE 3

A passive matrix reflection-type liquid crystal display panel in Example 3 will be described hereinafter.
(Back Panel)
A positive photosensitive acrylic resin (Optomer PC302 available from Japan Synthetic Rubber Co., Ltd.) was spread by a spin coating method (Rotational speed: 1500 rpm) on a flat glass substrate (Glass 7059 available from Corning Inc.) in a positive photosensitive film of about 1.5 μm in thickness for forming an insulating layer 12 as shown in FIG. 12B. Then, the glass substrate was heated at 80° C. for 60 sec on a hot plate for prebaking.

A photomask provided with a pattern of the first electrodes 13 was put on the positive photosensitive film in close contact with the surface of the positive photosensitive film, and then the positive photosensitive film was exposed to light emitted by an extra-high pressure mercury lamp (Power: 15 mW/cm$^2$, Wavelength: 405 nm) for 15 seconds (FIG. 12D). Subsequently, the exposed positive photosensitive film was immersed in a developing solution prepared by diluting PD523AD, a developer available from Japan Synthetic Rubber Co., Ltd., 11.9 times for 90 seconds for development as shown in FIG. 12E. The entire surface of the thus developed positive photosensitive film was exposed to light emitted by an extra-high pressure mercury lamp (Power: 15 mW/cm$^2$, Wavelength: 405 nm) for 30 seconds, and then the positive photosensitive film was heated at 220° C. for 60 minutes in an oven for postbaking. Since the passive matrix reflection-type liquid crystal display panel in Example 3 is a trial piece of the liquid crystal display panel in the third embodiment, the process shown in FIG. 12C was omitted.

A 0.2 μm thick aluminum thin film was deposited by a sputtering process over the insulating layer 12 as shown in FIG. 12F, and the aluminum thin film was patterned by an ordinary patterning process using a photomask to form stripe-shaped, 190 μm wide first electrodes 13a at intervals of 10 μm as shown in FIG. 12G to complete a back panel.
(Front Panel)
A 0.15 μm thick ITO film was deposited over a surface of a transparent glass substrate (Glass 7059 available from Coring Inc.), i.e., a front substrate 10b, by a sputtering process to form a transparent second electrodes in a predetermined pattern.
(Assembly of Liquid Crystal Display Panel)
Alignment films were formed on the inner surfaces of the front substrate 10b and the back substrate 10a, the front substrate panel and the back panel were disposed opposite to each other so as to form a space therebetween, and a guest-host liquid crystal containing 1.25% dichromatic dye was filled and sealed in the space between the front and the back panel to complete a liquid crystal display panel. When the reflection-type liquid crystal display panel was driven, the liquid crystal was not disturbed by leakage current, and the liquid crystal display panel lighted in white and displayed images in satisfactory visibility.

COMPARATIVE EXAMPLE 3

A reflection-type liquid crystal display panel in Comparative Example 3 was fabricated by a method similar to that of fabricating the reflection-type liquid crystal display panel in Example 3. The reflection-type liquid crystal display panel in Comparative Example 3 was provided with a continuous insulating layer which was not patterned into isolated portions, an aluminum thin film of a thickness equal to that of the aluminum thin film of Example 3 was formed on the insulating layer, the aluminum thin film was patterned in stripe-shaped first electrodes having a width equal to that of the first electrodes of the Example 3 and arranged at a pitch equal to that of the first electrodes of Example 3. Other conditions for fabricating the liquid crystal display panel in Comparative Example 3 were the same as those for fabricating the liquid crystal display panel in Example 3. When the reflection-type liquid crystal display panel was driven, a large leakage current flowed between the first electrodes, and the visibility of images displayed thereon was inferior to that of images displayed on the reflection-type liquid crystal display panel in Example 3.

EXAMPLE 4

A TFT reflection-type liquid crystal display panel in Example 4 will be described hereafter.
(Back Panel)
A positive photosensitive acrylic resin (Optomer PC302 available from Japan Synthetic Rubber Co., Ltd.) was spread by a spin coating method (Rotational speed: 1500 rpm) on a back substrate 10a, i.e., a glass substrate (Glass 7059 available from Corning Inc.) (FIG. 13A), provided with TFTs 11 on its inner surface in a positive photosensitive film of about 1.5 µm in thickness for forming an insulating layer 12 as shown in FIG. 13B. Then, the back substrate 10a was heated at 80° C. for 60 seconds on a hot plate for prebaking.

A ground glass plate 18 (Ground Glass #1500 available from Koei Kagaku K.K.) was put on the positive photosensitive film in close contact with the surface of the positive photosensitive film, and then the positive photosensitive film was exposed to light emitted by an extra-high pressure mercury lamp 19 (Power: 15 mW/cm², Wavelength: 405 nm) for 3 seconds (FIG. 13C).

Subsequently, a photomask 17 provided with a contact hole pattern 17c for forming contact holes and a pattern 17t for dividing the positive photosensitive film (Width of electrodes: 190 µm, Pitch of electrodes: 200 µm, Intervals between electrodes: 10 µm) was superposed on the positive photosensitive film and the positive photosensitive film was exposed to light emitted by an extra-high pressure mercury lamp (Power: 15 mW/cm², Wavelength: 405 nm) for 15 sec through the photomask 17 (FIG. 13D) to form contact holes 30 for connecting the drain electrodes of the TFTs to reflective first electrodes in the positive photosensitive film and to divide the positive photosensitive film, i.e., an insulating layer 12, into isolated portions.

Then the exposed positive photosensitive film was immersed in a developing solution prepared by diluting PD523AD, a developer available from Japan Synthetic Rubber Co., Ltd., 11.9 times for 90 seconds for development (FIG. 13E). Then, the entire surface of the positive photosensitive film was exposed to light emitted by an extra-high pressure mercury lamp (Power: 15 mW/cm², Wavelength: 405 nm) for 30 seconds, and then the positive photosensitive film was heated in an oven at 220° C. for 60 minutes for postbaking to form the insulating layer 12. Minute irregularities substantially complementary to those of the ground glass plate were formed in the surface of the insulating layer 12. A 0.2 µm thick aluminum thin film was formed on the surface of the insulating layer 12 by a sputtering process as shown in FIG. 13E. The aluminum film was patterned by an ordinary patterning process to form first electrodes 13a as shown in FIG. 13G to complete a back panel.

(Front Panel)

A 0.15 µm thick ITO film was deposited over a surface of a transparent glass substrate (Glass 7059 available from Coring Inc.), i.e., a front substrate 10b, by a sputtering process to form a common electrode.

(Assembly of Liquid Crystal Display Panel)

Alignment films were formed on the inner surfaces of the front substrate 10b and the back substrate 10a, the front panel and the back panel were disposed opposite to each other so as to form a space therebetween, and a guest-host liquid crystal containing 1.25% dichromatic dye was filled and sealed in the space between the front and the back panel to complete a liquid crystal display panel. When the reflection-type liquid crystal display panel was driven, the liquid crystal was not disturbed by leakage current and the liquid crystal display panel lighted in white and displayed images in satisfactory visibility.

COMPARATIVE EXAMPLE 4

A reflection-type liquid crystal display panel in Comparative Example 4 was fabricated by a method similar to that of fabricating the reflection-type liquid crystal display panel in Example 4. Although the insulating layer of the Comparative Example 4 was provided minute irregularities in its surface and was the same in material and thickness as the insulating layer of the Example 4, the former was not divided into isolated portions. The reflection-type liquid crystal display panel in Comparative Example 4 was the same in other respects as the reflection-type liquid crystal display panel in Example 4.

When the liquid crystal display panel was driven, leakage current flowed between the first electrodes and the visibility of images displayed by the liquid crystal display panel in Comparative Example 4 was inferior to that of images displayed by the reflection-type liquid crystal display panel in Example 4.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A reflection-type liquid crystal display panel having a back panel comprising a flat back substrate, an insulating layer formed on an inner surface of the flat back substrate, and reflective electrodes formed on the insulating layer;
    wherein both the insulating layer and the reflective electrode layer are divided by a first space and a second space, respectively, the first and second spaces containing an alignment film and being oriented perpendicular to the flat back substrate in an arrangement which is substantially the same as a pattern in which the electrodes are arranged; and
    further wherein the first space has substantially the same width as the second space and is aligned with the second space.

2. The reflection-type liquid crystal display panel according to claim 1, wherein TFTs are formed on the back substrate.

3. The reflection-type liquid crystal display panel according to claim 1, wherein the insulating layer has a surface provided with minute irregularities, and the back electrodes are formed on the insulating layer in a shape conforming to the minute irregularities of the insulating layer.

4. The reflection-type liquid crystal display panel according to claim 1, wherein the minute irregularities include ridges and valleys, and the height of the ridges of the minute irregularities is in the range of 0.4 to 10 µm.

5. The reflection-type liquid crystal display panel according to claim 1, wherein the first electrodes are formed by patterning a metal thin film having a thickness of 1 µm or below.

6. A reflection-type liquid crystal display panel according to claim 3, wherein the minute irregularities are formed continuously along the surface of the insulating layer.

7. The reflection-type liquid crystal display panel of claim 1, wherein a portion of the reflective electrode within the first space is coupled to the flat back substrate through a thin film transistor (TFT).

* * * * *